United States Patent
Wang et al.

(10) Patent No.: US 10,752,763 B2
(45) Date of Patent: Aug. 25, 2020

(54) HETEROPHASIC POLYOLEFIN COMPOSITION HAVING IMPROVED OPTICAL PROPERTIES

(71) Applicant: BOREALIS AG, Vienna (AT)

(72) Inventors: Jingbo Wang, Engerwitzdorf (AT); Markus Gahleitner, Neuhofen/Krems (AT); Friedrich Berger, Engerwitzdorf (AT); Markku Vahteri, Porvoo (FI); Joachim Fiebig, Engerwitzdorf (AT)

(73) Assignee: BOREALIS AG (AT)

( * ) Notice: Subject to any disclaimer, the term of this patent is extended or adjusted under 35 U.S.C. 154(b) by 0 days.

(21) Appl. No.: 16/477,571

(22) PCT Filed: Jan. 26, 2018

(86) PCT No.: PCT/EP2018/051905
§ 371 (c)(1),
(2) Date: Jul. 12, 2019

(87) PCT Pub. No.: WO2018/138235
PCT Pub. Date: Aug. 2, 2018

(65) Prior Publication Data
US 2019/0367715 A1    Dec. 5, 2019

(30) Foreign Application Priority Data

Jan. 30, 2017  (EP) .................................... 17153720

(51) Int. Cl.
*C08L 23/16*  (2006.01)
*C08L 23/12*  (2006.01)
*C08L 23/14*  (2006.01)

(52) U.S. Cl.
CPC .......... *C08L 23/12* (2013.01); *C08F 2500/05* (2013.01); *C08F 2810/10* (2013.01); *C08L 23/14* (2013.01); *C08L 23/16* (2013.01); *C08L 2205/02* (2013.01); *C08L 2205/025* (2013.01); *C08L 2205/03* (2013.01); *C08L 2205/24* (2013.01); *C08L 2207/02* (2013.01); *C08L 2314/02* (2013.01)

(58) Field of Classification Search
None
See application file for complete search history.

(56) References Cited

U.S. PATENT DOCUMENTS

| | | | |
|---|---|---|---|
| 5,204,037 A | 4/1993 | Fujii | |
| 2010/0249329 A1* | 9/2010 | Grein | C08L 23/142 525/240 |
| 2011/0129627 A1 | 6/2011 | Schedenig et al. | |

FOREIGN PATENT DOCUMENTS

| | | |
|---|---|---|
| EP | 1236769 A1 | 9/2002 |
| EP | 887380 B1 | 2/2004 |

(Continued)

OTHER PUBLICATIONS

Busico, et al., "Full Assignment of the 13C NMR Spectra of Regioregular Polypropylenes: Methyl and Methylene Region", Macromolecules 1997, 30, 6251-6263.

(Continued)

*Primary Examiner* — Richard A Huhn
(74) *Attorney, Agent, or Firm* — Tarolli, Sundheim, Covell & Tummino LLP

(57) ABSTRACT

Heterophasic polyolefin composition with improved optical properties, its preparation, articles made therefrom, particularly films, and use of the heterophasic polyolefin composition.

13 Claims, 1 Drawing Sheet

(56) References Cited

FOREIGN PATENT DOCUMENTS

| EP | 887379 | B1 | 12/2004 |
|---|---|---|---|
| EP | 887381 | B1 | 11/2005 |
| EP | 991684 | B1 | 1/2006 |
| EP | 2145923 | A1 | 1/2010 |
| EP | 2368938 | A1 | 9/2011 |
| EP | 2431416 | B1 | 10/2012 |
| WO | 92/12182 | A1 | 7/1992 |
| WO | 99/24478 | A1 | 5/1999 |
| WO | 99/24479 | A1 | 5/1999 |
| WO | 00/68315 | A1 | 11/2000 |
| WO | 2004/000899 | A1 | 12/2003 |
| WO | 2004/111095 | A1 | 12/2004 |
| WO | 2009/019277 | A1 | 2/2009 |
| WO | 2013/079457 | A1 | 6/2013 |
| WO | 2014/094990 | A2 | 6/2014 |
| WO | 2016/131907 | A1 | 8/2016 |

OTHER PUBLICATIONS

Busico et al., "Alk-1-ene Polymerization in the Presence of a Monocyclopentadienyl Zirconium(IV)Acetamidinate Catalyst: Microstructural and Mechanistic Insightsa", Macromol. Rapid Commun. 2007, 28, pp. 1128-1134.
H.N. Cheng, "13C NMR Analysis of Ethylene-Propylene Rubbers", Macromolecules 1984, 17, 1950-1955.
Resconi et al., "Selectivity in Propene Polymerization with Metallocene Catalysts", Chem. Rev. 2000, 100, pp. 1253-1345.
Busico, et al., "Microstructure of polypropylene", Prog. Polym. Sci. 26, (2001), pp. 443-533.
Wang et al., "Structural Analysis of Ethylene/Propylene Copolymers Synthesized with a Constrained Geometry Catalyst", Macromolecules 2000, 33, pp. 1157-1162.
Zhou et al., "A new decoupling method for accurate quantification of polyethylene copolymer composition and triad sequence distribution with 13C NMR", Journal of Magnetic Resonance 187 (2007) pp. 225-233.
Kakugo, et al., "13C NMR Determination of Monomer Sequence Distribution in Ethylene-Propylene Copolymers Prepared with", Macromolecules 1982, 15, 1150-1152.

\* cited by examiner

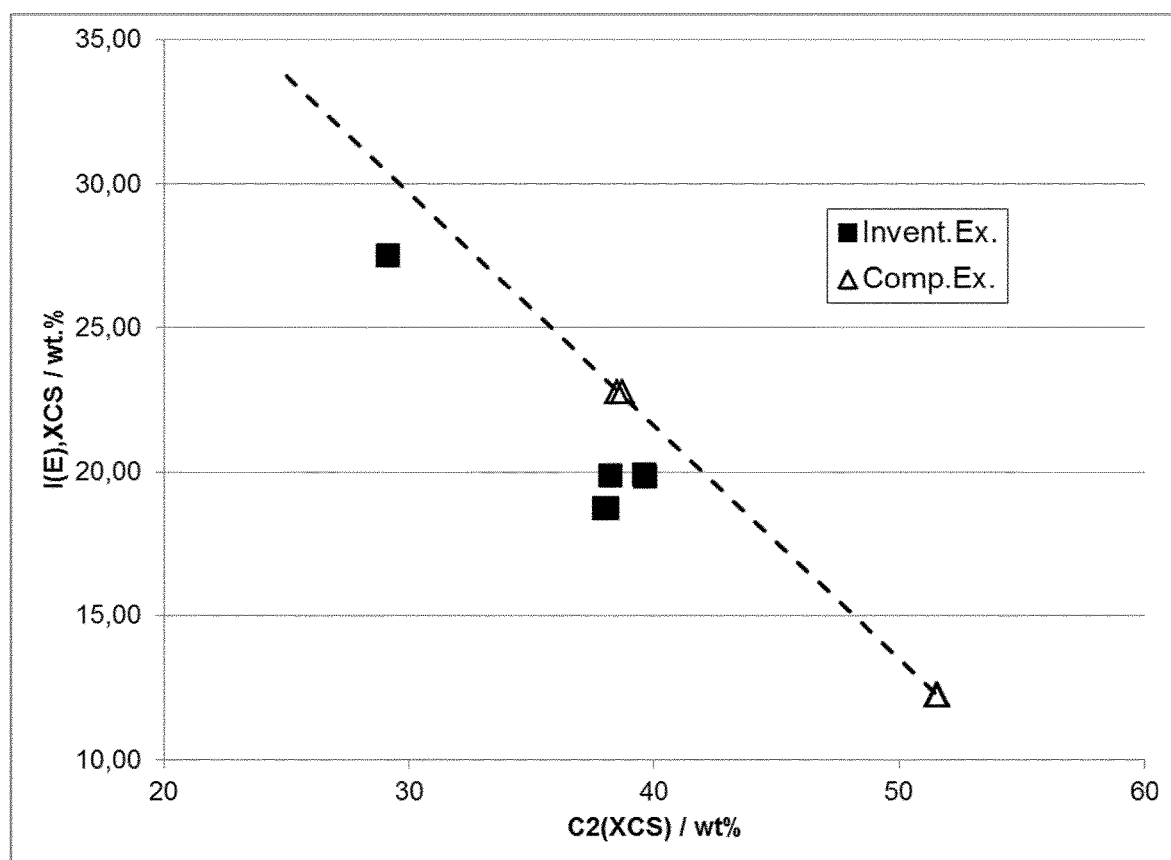
Inequation (I); dashed line indicates the limit of equation (I)

HETEROPHASIC POLYOLEFIN COMPOSITION HAVING IMPROVED OPTICAL PROPERTIES

The present invention relates to a heterophasic polyolefin composition with improved optical properties. The present invention further relates to a process for the preparation of such a heterophasic polyolefin composition, articles made therefrom, particularly films, and use of the heterophasic polyolefin composition.

Polymers, like polypropylene, are increasingly used in different demanding applications. At the same time there is a continuous search for tailored polymers which meet the requirements of these applications. The demands can be challenging, since many polymer properties are directly or indirectly interrelated, i.e. improving a specific property can only be accomplished on the expense of another property.

For example, polypropylene films are quite often used in the packaging industry for consumer related articles with good "see-through" properties on the content of the packed goods. There is an also increasing trend in the medical packaging industry to use such polypropylene films.

In these technical areas optical properties, especially low haze is always required.

It is known that heterophasic propylene copolymers (HECOs) are a generally suitable class of soft base polymers applicable for cast and blown film applications.

Such heterophasic propylene copolymers comprise a matrix being either a propylene homopolymer or a random propylene copolymer in which an amorphous phase, which contains a propylene copolymer rubber (elastomer), is dispersed. Thus the polypropylene matrix contains (finely) dispersed inclusions not being part of the matrix and said inclusions contain the elastomer. The term inclusion indicates that the matrix and the inclusion form different phases within the heterophasic propylene copolymer, said inclusions are for instance visible by high resolution microscopy, like electron microscopy or scanning force microscopy or atomic force microscopy, or by dynamic mechanical thermal analysis (DMTA). Further the heterophasic polypropylene may contain to some extent a crystalline polyethylene, which is a by-reaction product obtained by the preparation of the heterophasic propylene copolymer. Such crystalline polyethylene is present as inclusion of the amorphous phase due to thermodynamic reasons.

The rubber phase in such heterophasic systems normally scatters the light, which makes the resulting films produced from these systems white.

This is due to the fact that the rubber phase has different refractive index than the surrounding matrix and/or forms relatively big spheres.

Unfortunately there are very limited ways to tune the optical properties for film compositions. Generally, for achieving high transparency/low haze in two-phasic systems it is necessary to design a system where no scattering of light occurs at the phase boundaries. This can be achieved by proper selection of the refractive index of the two phases and/or by providing a dispersed phase which has a particle size below the wavelength of visible light, i.e. below about 400 nm.

One way to get transparency is to adapt the refractive indices from the matrix and that of the dispersed phase by PE-addition (LDPE or LLDPE). This proceeding can lead to very complex recipes and poses a limitation on stiffness in the sense of low tensile strength or low tensile modulus.

Good miscibility and/or dispersibility of the rubber particles within the matrix system is essential to ensure small rubber particles and hence good optical properties in the sense of low haze.

Many different types of heterophasic systems have been described depending on the individual desire.

WO 2013079457 A1 describes a polypropylene composition having a $MFR_2$ in the range of 0.5 to 6.0 g/10 min, comprising a propylene homopolymer, a random propylene copolymer, an elastomeric propylene copolymer, a polyethylene, and an alpha-nucleating agent, wherein the polypropylene composition is a heterophasic system in which the propylene homopolymer and the random propylene copolymer form the matrix of said system and the elastomeric propylene copolymer and the polyethylene are dispersed in said matrix. This composition achieves low haze values by adding significant amounts of LDPE which negatively affects the stiffness.

WO 2014094990 A1 describes a heterophasic polypropylene resin with an $MFR_2$ above 27 g/10 min and a good balance of high flowability, impact properties and low haze. This property profile is achieved by producing a heterophasic copolymer with a propylene homo- or copolymer matrix and a cross bimodal ethylene-propylene copolymer of low intrinsic viscosity, but the reported haze values on 1 mm plaques are not satisfying.

WO2009019277 describes heterophasic polypropylene compositions for soft and tough films. These products comprise a rather high amount of ethylene-propylene rubber fraction and are not suitable for stiffer moulded articles.

EP 2431416 A1 discloses a heterophasic polypropylene system showing good balance between stiffness and impact at low haze. The composition comprises a crystalline polypropylene matrix and requires the presence of two different polyethylene fractions to adjust the transparency by adapting the refractive indices of the matrix and the dispersed phase. This makes the respective production complicated and expensive.

Thus, although a lot of developments are ongoing in this area, there is still a need for heterophasic polypropylene compositions, which show improved optical properties, especially low haze.

Hence, it is an object of the present invention to provide such a material.

It is a further object to provide a polypropylene composition obtainable by a multiple reaction stage process having the above mentioned desired low haze. Simultaneously it is a desire to reduce complexity of the recipe.

The present invention is based on the finding that the above object can be achieved by a heterophasic polyolefin composition comprising specific matrix and rubber design.

So the present invention concerns a polypropylene composition and articles produced thereof which fulfil the low haze requirement.

The present invention in a special embodiment deals also with polymerization method, suitable for the production of the heterophasic polypropylene composition.

SUMMARY OF THE INVENTION

The present invention is based on the finding that the above mentioned objects can be achieved by a particular heterophasic propylene copolymer (HECO),
said heterophasic propylene copolymer (HECO) comprises a matrix (M) being a propylene homopolymer (H-PP) and an elastomeric propylene copolymer (EPC) dispersed in said matrix (M), wherein the heterophasic propylene copolymer (HECO) has
a) a melt flow rate $MFR_2$ (2.16 kg, 230° C.) measured according to ISO 1133 in the range of 0.2 to 8.0 g/10 min,
(b) a xylene cold soluble content (XCS) determined according ISO 16152 (25° C.) in the range of 10.0 to 20.0 wt %, and
(c) a total ethylene comonomer content in the range of more than 2.5 to 8.0 wt %,
wherein further
(d) the melt flow rate $MFR_2$ (2.16 kg, 230° C.) measured according to ISO 1133 of the matrix (M) is in the range of 0.2 to 4.0 g/10 min
(e) the ethylene comonomer content of xylene cold soluble (XCS) fraction of the heterophasic propylene copolymer is in the range of 25.0 to 40.0 wt %,
(f) the intrinsic viscosity (IV) determined according to DIN ISO 1628/1 (in decalin at 135° C.) of the xylene cold soluble (XCS) fraction of the heterophasic propylene copolymer is in the range of more than 1.0 to below 2.9 dl/g, and
(e) the relative content of isolated to block ethylene sequences (I(E)) of the XCS fraction fulfilling the inequation (I)

$$I(E)(XCS) < 54 - 0.81 \times C2(XCS) \qquad (I)$$

wherein C2 is the comonomer content [wt %] of the XCS fraction, XCS is the amount of xylene cold soluble fraction in [wt %]
and
wherein the I(E) content is defined by equation (II)

$$I(E) = fPEP/((fEEE + fPEE + fPEP)) \times 100 \qquad (II)$$

wherein
I(E) is the relative content of isolated to block ethylene sequences of the XCS fraction [in %];
fPEP is the mol fraction of propylene/ethylene/propylene sequences (PEP) of the XCS fraction;
fPEE is the mol fraction of propylene/ethylene/ethylene sequences (PEE) and of ethylene/ethylene/propylene sequences (EEP) of the XCS fraction;
fEEE is the mol fraction of ethylene/ethylene/ethylene sequences (EEE) of the XCS fraction,
wherein all sequence concentrations are based on a statistical triad analysis of $^{13}C$-NMR data from the XCS fraction of the heterophasic copolymer.

It has surprisingly been found out that such heterophasic propylene copolymers (HECOs) are polypropylene materials having improved optical properties, especially low haze. The inventive heterophasic propylene copolymers (HECOs) are applicable for the preparation of films for packaging.

The present invention further relates to a process for the production of the above heterophasic propylene polymer composition, comprising polymerizing propylene in at least 2 subsequent polymerization steps in the presence of a Ziegler-Natta catalyst and optionally subsequent visbreaking.

Thus, in one embodiment of the present invention, the heterophasic propylene copolymer (HECO) has been visbroken.

In one further embodiment of the present invention, the heterophasic propylene copolymer the heterophasic propylene copolymer (HECO) has a haze determined according to ASTM D 1003-00 measured on a 50 μm cast film of below 30.0%, preferably of below 20.0%.

In a further aspect the invention is related to the use of the composition for the production of films, being suitable as packaging film for consumer goods, as well as for medical packaging.

The present invention is further directed to a film comprising the heterophasic propylene copolymer (HECO).

DETAILED DESCRIPTION

In the following the individual components are defined in more detail.

The particular heterophasic polypropylene composition of the present invention comprises at least
(a) the crystalline matrix (M) being a polypropylene (PP)
(b) the elastomeric propylene copolymer (EPC) dispersed in said matrix (M);
as defined in more detail below.

Optionally it further comprises component (c) being a crystalline ethylene copolymer (CEC), and/or
(d) a nucleating agent.

The term "heterophasic polypropylene composition" used herein denotes compositions consisting of a crystalline polypropylene matrix resin and an elastomeric propylene copolymer dispersed in said matrix resin and optionally a crystalline ethylene copolymer (CEC) and optionally a nucleating agent.

In the present invention, the term "matrix" is to be interpreted in its commonly accepted meaning, i.e. it refers to a continuous phase (in the present invention a continuous polymer phase) in which isolated or discrete particles such as rubber particles may be dispersed. The crystalline propylene homopolymer is present in such an amount that it forms a continuous phase which can act as a matrix.

Furthermore the terms "elastomeric propylene copolymer (EPC)", "xylene cold soluble (XCS) fraction of the heterophasic propylene copolymer", "dispersed phase" and "ethylene-propylene rubber" denote the same, i.e. are interchangeable.

Ad Component (a):

Component (a) of the particular heterophasic polypropylene composition is a crystalline isotactic propylene homopolymer forming the matrix of the heterophasic polypropylene composition.

The expression homopolymer used in the instant invention relates to a polypropylene that consists substantially, i.e. of at least 97.0 wt %, preferably of at least 98.0 wt %, more preferably of at least 99.0 wt %, still more preferably of at least 99.8 wt % of propylene units. In a preferred embodiment only propylene units in the propylene homopolymer are detectable.

The propylene homopolymer matrix is isotactic having a high pentad concentration, i.e. higher than 96.0 mol %, like a pentad concentration of at least 96.3 mol %. The pentad concentration is preferably 96.5 mol % up to 99.9% and more preferably 96.7 mol % to 99.8%.

The propylene homopolymer matrix has a melt flow rate $MFR_2$ (ISO 1133; 230° C.; 2.16 kg) in the range of 0.2 to 4.0 g/10 min, preferably in the range of 0.4 to 3.0 g/10 min and more preferably in the range of 0.8 to 2.0 g/10 min.

The $MFR_2$ of the matrix is named matrix melt flow rate $(MFR_M)$.

Moreover it is preferred that the amount of xylene solubles of propylene homopolymer matrix is not too high. Xylene solubles are the part of the polymer soluble in cold xylene determined by dissolution in boiling xylene and letting the insoluble part crystallize from the cooling solution (determined at 25° C. according to ISO 16152). The xylene solubles fraction contains polymer chains of low stereo-regularity and is an indication for the amount of non-crystalline areas. Accordingly it is preferred that the xylene solubles fraction of the propylene homopolymer matrix is in the range of 0.5 wt % to 3.0 wt %, more preferably in the range of 0.7 wt % to 2.7 wt %. In an even more preferred embodiment the xylene solubles fraction is in the range of 0.8 wt % to 2.3 wt %.

The propylene homopolymer has a melting temperature $T_{m1}$ and a melting enthalpy $H_{m1}$ determined by DSC analysis according to ISO 11357.

Preferably, $T_{m1}$ of the propylene homopolymer is within the range of 160° C. to 170° C., more preferably within the range of 161° C. to 169° C. and most preferably within the range of 162° C. to 168° C.

Preferably, $H_{m1}$ of the propylene homopolymer is in the range of 70.0 to 100.0 J/g, more preferably in the range of 75.0 to 98.0 J/g and most preferably within the range of 77.0 to 97.0 J/g.

The propylene homopolymer matrix can be unimodal or multimodal, like bimodal.

When the propylene homopolymer matrix phase is unimodal with respect to the molecular weight distribution, it may be prepared in a single stage process e.g. a slurry or gas phase process in a slurry or gas phase reactor. Preferably, a unimodal matrix phase is polymerized as a slurry polymerization. Alternatively, the unimodal matrix may be produced in a multistage process using at each stage process conditions which result in similar polymer properties.

Concerning the definition of unimodal and multimodal, like bimodal, it is referred to the definition below.

Where the propylene homopolymer matrix comprises two or more different propylene polymers, like propylene homopolymer fractions (H-PP-1) and (H-PP-2) these may be polymers with different monomer make up and/or with different molecular weight distributions. These components may have identical or differing monomer compositions and tacticities.

Thus in one embodiment or the present invention the matrix (M) is unimodal, whereas in another embodiment the matrix (M) is bimodal and consists of two propylene homopolymer fractions (H-PP-1) and (H-PP-2).

Ad Component (b):

Component b) is an elastomeric propylene copolymer (EPC), which is a copolymer of propylene and ethylene being dispersed in said matrix (M) (i.e. dispersed phase).

Component (b) of the particular heterophasic polypropylene composition is a predominantly amorphous propylene copolymer.

The elastomeric propylene copolymer (EPC) has an ethylene comonomer content in the range of 25.0 to 40.0 wt %, preferably in the range of 27.0 to 40.0 wt % and more preferably in the range of 28.0 to 40.0 wt %.

As stated above, the terms "elastomeric propylene copolymer (EPC)", "xylene cold soluble (XCS) fraction of the heterophasic propylene copolymer", "dispersed phase" and "ethylene-propylene rubber" denote the same, i.e. are interchangeable.

Thus the amount of elastomeric propylene copolymer (EPC) constitutes the amount of the xylene cold soluble (XCS) fraction of the heterophasic propylene copolymer, which is in the range of 10.0 to 20.0 wt % in view of the heterophasic propylene copolymer, preferably in the range of 10.5 to 18.0 wt % and more preferably in the range of 11.0 to 16.0 wt %.

The intrinsic viscosity (IV) measured according to ISO 1628-1 (at 135° C. in decalin) of the XCS fraction is in the range of more than 1.0 to below 2.9 dl/g, preferably in the range of 1.2 to 2.8 dl/g, more preferably in the range of 1.3 to 2.7 dl/g.

Like the propylene homopolymer matrix, the dispersed phase can be unimodal or multimodal, like bimodal.

In one embodiment, the dispersed phase is unimodal. More particularly, the dispersed phase is preferably unimodal in view of the intrinsic viscosity and/or the comonomer distribution. Concerning the definition of unimodal and multimodal, like bimodal, it is referred to the definition above.

Preferably the unimodal dispersed phase is made in one reaction stage, more preferably in a gas phase reactor ad comprises, respectively consists of one propylene copolymer fraction (EPC).

Ad Component (c)

As component (c) a crystalline ethylene copolymer with an α-olefin with 3-10 carbon atoms is optionally present.

α-olefins with 3-10 carbon atoms are for example propylene, 1-butene, 1-pentene, 1-hexene, 1-heptene and 1-octene.

The crystalline ethylene copolymer is a by-reaction product obtained by the preparation of the heterophasic polypropylene composition. Such crystalline ethylene copolymer is present as inclusion in the amorphous phase due to thermodynamic reasons.

The crystalline ethylene copolymer has a melting temperature $T_{m2}$ and a melting enthalpy $H_{m2}$ as determined by DSC analysis according to ISO 11357.

Preferably, $T_{m2}$ of the crystalline ethylene copolymer is within the range of 105° C. to 130° C., more preferably within the range of 110° C. to 127° C. and most preferably within the range of 112° C. to 124° C.

Preferably, $H_{m2}$ of the crystalline ethylene copolymer is less than 4.0 J/g, more preferably less than 2.0 J/g and most preferably less than 1.0 J/g.

Ad Component (d)

As optional component (d) a nucleating agent (NA) for promoting the α-phase of isotactic polypropylene can be present.

Preferably the nucleating agent is a polymeric nucleating agent, more preferably a vinylcycloalkane polymer and/or a vinylalkane polymer.

Said polymeric nucleating agent may be introduced into the composition by blending with a masterbatch (MB) together with e.g. a carrier polymer or during polymerization of the heterophasic propylene copolymer (HECO), preferably, the polymeric nucleating agent is introduced into the composition by prepolymerizing the catalyst used to prepare a part or all of the heterophasic propylene copolymer (HECO).

Any known polymeric nucleating agent may be employed including polymers of vinyl alkanes and vinyl cycloalkanes.

A preferred example of such a polymeric nucleating agent is a vinyl polymer, such as a vinyl polymer derived from monomers of the formula

wherein $R^1$ and $R^2$, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched $C_4$-$C_{30}$ alkane, $C_4$-$C_{20}$ cycloalkane or $C_4$-$C_{20}$ aromatic ring. Preferably $R^1$ and $R^2$, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

In case the nucleating agent is incorporated to the polypropylene composition in the form of a masterbatch (MB) said polymeric nucleating agent, which is preferably alpha-nucleating agent, most preferably a vinylcycloalkane, like vinylcyclohexane (VCH), polymer and/or vinylalkane polymer, preferably vinylcyclohexane (VCH), as defined above or below, is preferably present in an amount of not more than 500 ppm, more preferably of 1 to 200 ppm, and still more preferably of 5 to 100 ppm, based on the weight of the master batch (100 wt %). In this embodiment, more preferably, said masterbatch (MB) is present in an amount of not more than 10.0 wt %, more preferably not more than 5.0 wt % and most preferably not more than 3.5 wt %, with the preferred amount of masterbatch (MB) being from 1.5 to 3.5 wt %, based on the total amount of the heterophasic propylene copolymer (HECO). Most preferably the masterbatch (MB) comprises, preferably consists of a homopolymer or copolymer, preferably homopolymer, of propylene which has been nucleated according to BNT-technology as described below.

It is preferred that the nucleating agent is introduced to the polypropylene composition during the polymerization process of the heterophasic propylene copolymer (HECO). The nucleating agent is preferably introduced to the heterophasic propylene copolymer (HECO) by first polymerizing the above defined vinyl compound, preferably vinylcycloalkane, as defined above or below, in the presence of a catalyst system comprising a solid catalyst component, preferably a solid Ziegler Natta catalyst component, a cocatalyst and optional external donor, and the obtained reaction mixture of the polymer of the vinyl compound, preferably vinyl cyclohexane (VCH) polymer, and the catalyst system is then used for producing the heterophasic propylene copolymer (HECO). The above incorporation of the polymeric nucleating agent to the heterophasic propylene copolymer (HECO) during the polymerization of said heterophasic propylene copolymer (HECO) is called herein as BNT-technology as described below.

Said obtained reaction mixture is herein below referred interchangeably as modified catalyst system.

Preferably the polymeric nucleating agent is vinylcyclohexane (VCH) polymer which is introduced into the heterophasic propylene copolymer (HECO) by the BNT technology.

More preferably in this preferred embodiment, the amount of polymeric nucleating agent, like vinylcyclohexane (VCH), polymer and/or vinylalkane polymer, more preferably of vinylcyclohexane (VCH) polymer, in the heterophasic propylene copolymer (HECO) is not more than 500 ppm, more preferably of 1 to 200 ppm, most preferably 5 to 100 ppm.

With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the Ziegler-Natta procatalyst, an external donor and a cocatalyst, which vinyl compound has the formula: $CH_2=CH-CHR^1R^2$ as defined above.

The polymerized vinyl compound acts as an alpha-nucleating agent. The weight ratio of vinyl compound to solid catalyst component in the modification step of the catalyst is preferably of up to 5 (5:1), preferably up to 3 (3:1) most preferably from 0.5 (1:2) to 2 (2:1). The most preferred vinyl compound is vinylcyclohexane (VCH).

When a nucleating agent is introduced to the heterophasic propylene copolymer (HECO) during the polymerization process, the amount of nucleating agent present in the heterophasic propylene copolymer (HECO) is preferably not more than 500 ppm, more preferably is 0.025 to 200 ppm, still more preferably is 1 to 100 ppm, and most preferably is 5 to 100 ppm, based on the heterophasic propylene copolymer (HECO) and the nucleating agent, preferably based on the total weight of the heterophasic propylene copolymer (HECO) including all additives.

The use of the polymeric nucleating agent in accordance with the present invention enables the preparation of heterophasic propylene copolymer (HECO) having highly satisfactory mechanical properties, i.e. for improved stiffness/impact balance, so that it is not required for the compositions in accordance with the present invention to contain low molecular weight nucleating agents, in particular costly particulate nucleating agents like organo-phosphates or soluble nucleants like sorbitol- or nonitol-derived nucleating agents.

Ad Heterophasic Composition

The heterophasic polypropylene copolymer (HECO) of the present inventions is further characterized by a total melt flow rate ($MFR_T$) (ISO 1133; 230° C.; 2.16 kg) in the range of 0.2 to 8.0 g/10 min, preferably in the range of 0.5 to 7.0 g/10 min, more preferably in the range of 0.6 to 6.5 g/10 min and even more preferably in the range of 0.7 to 6.0 g/10 min.

According to one embodiment the final melt flow rate of the heterophasic propylene copolymer (HECO) is adjusted during the polymerization process. Accordingly the reactor-made heterophasic propylene copolymer (HECO) has the melt flow rate as defined above or in the claims. "Reactor-made heterophasic propylene copolymer (HECO)" denotes herein that the melt flow rate of the heterophasic propylene copolymer (HECO) has not been modified on purpose by post-treatment. Accordingly, in this embodiment the heterophasic propylene copolymer (HECO) is non-visbroken, particularly not visbroken using peroxide. Accordingly, the melt flow rate is not increased by shortening the chain length of the heterophasic propylene copolymer (HECO) according to this invention by use of peroxide. Thus it is preferred that the heterophasic propylene copolymer (HECO) does not contain any peroxide and/or decomposition product thereof.

According to another embodiment of the present invention, the heterophasic propylene copolymer (HECO) is visbroken.

The visbroken heterophasic propylene copolymer (HECO) preferably has a higher melt flow rate than the non-visbroken heterophasic propylene copolymer (HECO).

In a further embodiment of the present invention, the heterophasic propylene copolymer (HECO) has been visbroken with a visbreaking ratio (VR) as defined by equation (III)

$$VR=MFR_{final}/MFR_{start}>1.0$$

wherein

"MFR$_{final}$" is the MFR$_2$ (230° C./2.16 kg) of the heterophasic propylene copolymer (HECO) after visbreaking (i.e. MFR$_{total}$ for visbroken HECOs) and "MFR$_{start}$" is the MFR$_2$ (230° C./2.16 kg) of the heterophasic propylene copolymer (HECO) before visbreaking.

Said visbreaking ratio (VR) is preferably in the range of >1.0 to 5.0, more preferably in the range of 2.0 to 4.5 and even more preferably in the range of 2.5 to 4.2.

Preferred mixing devices suited for visbreaking are discontinuous and continuous kneaders, twin screw extruders and single screw extruders with special mixing sections and co-kneaders.

By visbreaking the heterophasic propylene copolymer (HECO) with heat or at more controlled conditions with peroxides, the molar mass distribution (MWD) becomes narrower because the long molecular chains are more easily broken up or scissored and the molar mass M, will decrease, corresponding to an MFR$_2$ increase. The MFR$_2$ increases with increase in the amount of peroxide which is used.

Such visbreaking may be carried out in any known manner, like by using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis (tert.butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of heterophasic propylene copolymer (HECO) to be subjected to visbreaking, the MFR$_2$ (230° C./2.16 kg) value of the heterophasic propylene copolymer (HECO) to be subjected to visbreaking and the desired target MFR$_2$ (230° C./2.16 kg) of the product to be obtained. Accordingly, typical amounts of peroxide visbreaking agent are from 0.005 to 0.7 wt %, more preferably from 0.01 to 0.4 wt %, based on the total amount of heterophasic propylene copolymer (HECO) employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

It is also appreciated that the total content of the ethylene comonomers in the total heterophasic propylene copolymer (HECO) is rather moderate.

Accordingly it is preferred that the heterophasic propylene copolymer (HECO) has a total ethylene comonomer content in the range of 2.5 to 8.0 wt %, preferably in the range of 3.0 to 8.0 wt % and more preferably in the range of 3.5 to 7.8 wt %.

As has been described above for component b) it is appreciated that the xylene cold soluble (XCS) fraction of the heterophasic propylene copolymer (HECO) in the present invention is specified by its intrinsic viscosity. A low intrinsic viscosity (IV) value reflects a low average molecular weight. For the present invention it is preferably required that the xylene cold soluble fraction (XCS) of the heterophasic propylene copolymer (HECO) has an intrinsic viscosity (IV) measured according to ISO 1628/1 (at 135° C. in decalin) in the range of 1.0 to below 2.9 dl/g, preferably in the range of 1.2 to below 2.8 dl/g, more preferably in the range of 1.3 to 2.7 dl/g.

The xylene cold soluble (XCS) fraction of the heterophasic propylene copolymer (HECO) in the present invention is further specified by its ethylene comonomer content which is in the range of 25.0 to 40.0 wt %, preferably in the range of 27.0 to 40.0 wt % and more preferably in the range of 28.0 to 40.0 wt %.

A further requirement for the inventive HECO is that the relative content of isolated to block ethylene sequences (I(E)) of the XCS fraction has to fulfill the inequation (I), preferably the inequation (II)

$$I(E)(XCS) < 54 - 0.81 \times C2(XCS) \qquad (I)$$

$$I(E)(XCS) < 52 - 0.81 \times C2(XCS) \qquad (II)$$

wherein C2(XCS) is the comonomer content [wt %] of the XCS fraction, XCS is the amount of xylene cold soluble fraction in [wt %]

and wherein the I(E) content of the XCS fraction is defined by equation (II)

$$I(E) = fPEP/((fEEE + fPEE + fPEP)) \times 100 \qquad (II)$$

wherein

I(E) is the relative content of isolated to block ethylene sequences of the XCS fraction [in %];

fPEP is the mol fraction of propylene/ethylene/propylene sequences (PEP) of the XCS fraction;

fPEE is the mol fraction of propylene/ethylene/ethylene sequences (PEE) and of ethylene/ethylene/propylene sequences (EEP) of the XCS fraction;

fEEE is the mol fraction of ethylene/ethylene/ethylene sequences (EEE) of the XCS fraction wherein all sequence concentrations are based on a statistical triad analysis of $^{13}$C-NMR data of the XCS fraction.

The part of the heterophasic propylene copolymer (HECO) which is not soluble in cold xylene is the xylene cold insoluble (XCI) fraction. In a further preferred embodiment of the present invention also this fraction preferably exhibits some specific properties.

Accordingly the ethylene content in the cold insoluble fraction (XCI) of the heterophasic propylene copolymer (HECO) is in the range of 1.0 to 3.5 wt %, preferably in the range of 1.2 to 3.2 wt %.

Furthermore the inventive heterophasic polypropylene composition has at least a first glass transition temperature $T_g(1)$ and a second glass transition temperature $T_g(2)$, wherein said first glass transition temperature $T_g(1)$ is above the second glass transition temperature $T_g(2)$. The glass transition temperature $T_g$ is determined by dynamic mechanical analysis (DMTA) according to ISO 6721-7.

Accordingly it is especially preferred that the heterophasic polypropylene composition has a first glass transition temperature $T_g(1)$ in the range of −4 to +4° C. and/or a second glass transition temperature $T_g(2)$ in the range of −65 to −50° C.

The multiphase structure of the heterophasic polypropylene composition (predominantly amorphous propylene copolymer dispersed in the matrix) can be identified by the presence of at least two distinct glass transition temperatures. The higher first glass transition temperature ($T_g(1)$)

represents the matrix, i.e. the crystalline polypropylene homopolymer, whereas the lower second glass transition temperature ($T_g(2)$) reflects the predominantly amorphous propylene copolymer of the heterophasic polypropylene composition.

Preferably the first glass transition temperature $T_g(1)$ is in the range of −3 to +3° C., more preferably in the range of −2 to +2° C.

The second glass transition temperature $T_g(2)$ is preferably in the range of −62 to −53° C., more preferably in the range of −60 to −54° C.

The heterophasic propylene copolymer (HECO) of the present invention is composed of components (a) and (b) and optional components (c) and/or (d).

Component (a) is present in an amount of from 82.0 to 93.0 wt %, preferably from 84.0 to 93.0 wt % and more preferably from 86.0 to 92.0 wt %

Component (b) is present in an amount of from 7.0 to 18.0 wt %, preferably from 7.0 to 16.0 wt % and more preferably from 8.0 to 14.0 wt %.

Component (c) is present in an amount of from 0.0 to 5.0 wt %, preferably from 0.0 to 4.0 wt % and more preferably from 0.0 to 3.0 wt %.

Component (d) is present in an amount of from 0.0 to 0.1 wt %, preferably from 0.0 to 0.05 wt % and more preferably from 0.0 to 0.01 wt %.

If component (d) is added in the form of a masterbatch (MB), the amount of masterbatch containing component (d) is up to 10.0 wt % related to the entire heterophasic propylene copolymer (HECO), preferably up to 5.0 wt % and more preferably in the range of 1.5 to 3.5 wt % based on the entire heterophasic propylene copolymer (HECO).

The sum of fractions (a), (b), (c) and (d) is 100 wt % or lower depending on the presence of further fractions or additives. The ranges in percent by weight (wt %) as used herein define the amount of each of the fractions or components based on the entire heterophasic propylene copolymer (HECO) according to the present invention. All fractions and components together give a sum of 100 wt %.

The heterophasic propylene copolymer (HECO) according to the present invention apart from the polymeric components and the nucleating agent (d), optionally in the form of a masterbatch (MB), may comprise further non-polymeric components, e.g. additives for different purposes.

The following are optional additives: process and heat stabilisers, pigments and other colouring agents allowing retaining transparency, antioxidants, antistatic agents, slip agents, antiblocking agent, UV stabilisers and acid scavengers.

Depending on the type of additive, these may be added in an amount of 0.001 to 2.0 wt %, based on the weight of the heterophasic propylene copolymer (HECO).

Preparation of the Heterophasic Propylene Copolymer (HECO)

The heterophasic propylene copolymer (HECO) in accordance with the present invention may be prepared by any suitable process, including in particular blending processes such as mechanical blending including mixing and melt blending processes and any combinations thereof as well as in-situ blending during the polymerization process. These can be carried out by methods known to the skilled person, including batch processes and continuous processes.

The heterophasic propylene copolymer (HECO) according to the invention is preferably prepared by a sequential polymerization process, as described below, in the presence of a catalyst system comprising a Ziegler-Natta Catalyst (ZN-C), a cocatalyst (Co) and optionally an external donor (ED), as described below.

The term "sequential polymerization system" according to this invention indicates that the heterophasic propylene copolymer (HECO) is produced in at least two polymerization reactors connected in series. Accordingly, the present polymerization system comprises at least a first polymerization reactor (R1), a second polymerization reactor (R2), optionally a third polymerization reactor (R3), and further optionally a fourth polymerization reactor (R4). The term "polymerization reactor" shall indicate that the main polymerization takes place.

Preferably, at least one of the two polymerization reactors (R1) and (R2) is a gas phase reactor (GPR). More preferably the second polymerization reactor (R2), the optional third polymerization reactor (R3) and the optional fourth polymerization reactor (R4) are gas phase reactors (GPRs), i.e. a first gas phase reactor (GPR1) and a second gas phase reactor (GPR2) and a third gas phase reactor (GPR3). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

In this first polymerization reactor (R1) the matrix polypropylene (H-PP) or part of it, i.e. a first propylene homopolymer fraction (H-PP-1), is produced.

Preferably this propylene homopolymer of the first polymerization reactor (R1), more preferably the polymer slurry of the loop reactor (LR) containing the matrix (M) or part of it, i.e. a first propylene homopolymer fraction (H-PP-1), is directly fed into the second polymerization reactor (R2), i.e. into the (first) gas phase reactor (GPR1), without a flash step between the stages.

This kind of direct feed is described in EP 887379 A, EP 887380 A, EP 887381 A and EP 991684 A.

By "direct feed" is meant a process wherein the content of the first polymerization reactor (R1), i.e. of the loop reactor (LR), the polymer slurry comprising the propylene homopolymer matrix (H-PP) or part of it, i.e. a first propylene homopolymer fraction (H-PP-1), is led directly to the next stage gas phase reactor.

Alternatively, the propylene homopolymer of the first polymerization reactor (R1), preferably polymer slurry of the loop reactor (LR) containing the propylene homopolymer matrix, may be also directed into a flash step or through a further concentration step before fed into the second polymerization reactor (R2), i.e. into the $1^{st}$ gas phase reactor (GPR1). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2) and any subsequent reactor, for instance, the third (R3) or fourth polymerization reactor (R4) are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus, in a preferred embodiment the first polymerization reactor (R1) is a slurry reactor (SR), like loop reactor (LR), whereas the second polymerization reactor (R2) and the optional third polymerization reactor (R3), and the optional fourth polymerization reactor (R4) are gas phase reactors (GPRs).

Accordingly for the instant process at least two, preferably two polymerization reactors (R1), and (R2) or three polymerization reactors (R1), (R2) and (R3), or even four polymerization reactors (R1), (R2), R(3) and (R4), namely a slurry reactor (SR), like loop reactor (LR) and a (first) gas phase reactor (GPR1), an optional second gas phase reactor (GPR2), and optionally a third gas phase reactor (GPR3) connected in series are used.

Prior to the slurry reactor (SR) a pre-polymerization reactor is placed.

As the process covers also a pre-polymerization step, all of the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

Especially good results are achieved in case the temperature in the reactors is carefully chosen.

Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and in the optional third reactor (R3) and the optional the fourth reactor (R4) is in the range of 75 to 95° C., more preferably in the range of 78 to 92° C.

Preferably the operating temperature in the second polymerization reactor (R2) is equal to or higher than the operating temperature in the first polymerization reactor (R1). Accordingly it is preferred that the operating temperature
(a) in the first polymerization reactor (R1) is in the range of 62 to 85° C., more preferably in the range of 65 to 82° C., still more preferably in the range of 67 to 80° C., like 70 to 80° C.; and
(b) in the second polymerization reactor (R2) is in the range of 75 to 95° C., more preferably in the range of 78 to 92° C., still more preferably in the range of 78 to 88° C.,
with the proviso that the operating temperature in the in the second polymerization reactor (R2) is equal or higher to the operating temperature in the first polymerization reactor (R1).

Typically the pressure in the first polymerization reactor (R1), preferably in the loop reactor (LR), is in the range from 20 to 80 bar, preferably 30 to 70 bar, like 35 to 65 bar, whereas the pressure in the second polymerization reactor (R2), i.e. in the (first) gas phase reactor (GPR1), and in any subsequent reactor, like in the third polymerization reactor (R3), e.g. in the second gas phase reactor (GPR2), or in a fourth polymerization reactor (R4), e.g. in the third gas phase reactor (GPR3) is in the range from 5 to 50 bar, preferably 15 to 40 bar.

Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time ($\tau$) is defined as the ratio of the reaction volume (VR) to the volumetric outflow rate from the reactor (Qo) (i.e. VR/Qo), i.e $\tau$=VR/Qo [tau=VR/Qo]. In case of a loop reactor the reaction volume (VR) equals to the reactor volume.

Accordingly the average residence time ($\tau$) in the first polymerization reactor (R1) is preferably at least 5 min, more preferably in the range of 15 to 80 min, still more preferably in the range of 20 to 60 min, like in the range of 24 to 50 min, and/or the average residence time ($\tau$) in the second polymerization reactor (R2) is preferably at least 70 min, more preferably in the range of 70 to 220 min, still more preferably in the range of 80 to 210 min, yet more preferably in the range of 90 to 200 min, like in the range of 90 to 190 min. Preferably the average residence time ($\tau$) in the third polymerization reactor (R3) or in the fourth polymerization reactor (R4)—if present—is preferably at least 30 min, more preferably in the range of 30 to 120 min, still more preferably in the range of 40 to 100 min, like in the range of 50 to 90 min.

As mentioned above the preparation of the heterophasic propylene copolymer (HECO) comprises in addition to the (main) polymerization of the propylene polymer in the at least two polymerization reactors (R1, R2 and optional R3, R4) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN-C), the co-catalyst (Co), and the external donor (ED) are only added in the pre-polymerization reactor (PR).

The pre-polymerization reaction is typically conducted at a temperature of 10 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed can be employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre- PP). The sizes of the introduced Ziegler-Natta catalyst (ZN-C) particles as well as of the obtained fragments are not of essential relevance for the instant invention and within the skilled knowledge.

Accordingly, the heterophasic propylene copolymer (HECO) is preferably produced in a process comprising polymerizing propylene in at least two subsequent polymerization steps in the presence of a Ziegler-Natta catalyst, whereby:

a) In the first polymerization reactor (R1), i.e. in a loop reactor (LR), propylene is polymerized obtaining either a first propylene homopolymer fraction (H-PP-1) or the propylene homopolymer matrix (M), transferring said first propylene homopolymer fraction (H-PP-1) or propylene homopolymer matrix (M) to a second polymerization reactor (R2), c) in the second polymerization reactor (R2) either a second propylene homopolymer fraction (H-PP-2), forming together with the first propylene homopolymer fraction (H-PP-1) the propylene homopolymer matrix (M) or the propylene copolymer fraction (EPC) in the presence of the propylene homopolymer matrix (M) produced in earlier step a) is produced, whereupon c) if in the first and the second polymerization reactor the propylene homopolymer matrix (M) is produced, in a third polymerization reactor (R3) the propylene copolymer fraction (EPC) in the presence of the propylene homopolymer matrix (M) produced in earlier steps a) and b) is produced, d) optionally subsequent visbreaking of the heterophasic propylene copolymer (HECO) obtained after step b) respectively c).

In another preferred process also a prepolymerization step is included prior to the reaction in the first polymerization reactor (R1).

In such a pre-polymerization step prior to the reaction in the first polymerization reactor (R1), a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). Subsequent to the pre-polymerization, the mixture (MI) of the Ziegler-Natta catalyst (ZN-C) and the polypropylene (Pre-PP) produced in the pre-polymerization reactor (PR) is transferred to the first reactor (R1). Typically the total amount of the polypropylene (Pre-PP) in the final heterophasic propylene copolymer (HECO) is rather low and typically not more than 5.0 wt %, more preferably not more than 4.0 wt %, still more preferably in the range of 0.5 to 4.0 wt %, like in the range 1.0 of to 3.0 wt %

A preferred multistage process is a "loop-gas phase"-process, as developed by Borealis (known as BORSTAR® technology) and is described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic polypropylene composition is obtained by a multistage polymerization process, as described above, in the presence of a catalyst system.

In the process described above a Ziegler-Natta catalyst (ZN-C) for the preparation of the heterophasic polypropylene composition is applied. This Ziegler-Natta catalyst (ZN-C) can be any stereo-specific Ziegler-Natta catalyst (ZN-C) for propylene polymerization, which preferably is capable of catalysing the polymerization and copolymerization of propylene and comonomers at a pressure of 500 to 10000 kPa, in particular 2500 to 8000 kPa, and at a temperature of 40 to 110° C., in particular of 60 to 110° C.

Preferably, the Ziegler-Natta catalyst (ZN-C) comprises a high-yield Ziegler-Natta type catalyst including an internal donor component, which can be used at high polymerization temperatures of 80° C. or more.

Such high-yield Ziegler-Natta catalyst (ZN-C) can comprise a succinate, a diether, a phthalate etc., or mixtures therefrom as internal donor (ID) and are for Example commercially available for example from LyondellBasell under the Avant ZN trade name.

Examples of the Avant ZN series are Avant ZN 126 and Avant ZN 168. Avant ZN 126 is a Ziegler-Natta catalyst with 3.5 wt % titanium and a diether compound as internal electron donor, which is commercially available from LyondellBasell. Avant ZN 168 is a Ziegler-Natta catalyst with 2.6 wt % titanium and a succinate compound as internal electron donor, which is commercially available from LyondellBaselll.

A further Example of the Avant ZN series is the catalyst ZN180M of Basell.

The Ziegler-Natta catalyst (ZN-C) is preferably used in association with an alkyl aluminum cocatalyst (Co) and optionally external donors (ED).

As further component in the instant polymerization process an external donor (ED) is preferably present. Suitable external donors include certain silanes, ethers, esters, amines, ketones, heterocyclic compounds and blends of these. It is especially preferred to use a silane. It is most preferred to use silanes of the general formula

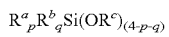
$$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula

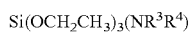
$$Si(OCH_2CH_3)_3(NR^3R^4)$$

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^3$ and $R^4$ are the same, yet more preferably both $R^3$ and $R^4$ are an ethyl group.

Especially preferred external donors (ED) are the dicyclopentyl dimethoxy silane donor (D-donor) or the cyclohexylmethyl dimethoxy silane donor (C-Donor).

In addition to the Ziegler-Natta catalyst (ZN-C) and the optional external donor (ED), a co-catalyst (Co) can be used. The co-catalyst (Co) is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkyl-aluminium, like triethylaluminium (TEAL), dialkyl aluminium chloride or alkyl aluminium dichloride or mixtures thereof. In one specific embodiment the co-catalyst (Co) is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 5 to 45, preferably is in the range of 5 to 35, more preferably is in the range of 5 to 25; and optionally
(b) the mol-ratio of co-catalyst (Co) to titanium compound (TC) [Co/TC] must be in the range of above 80 to 500, preferably is in the range of 100 to 350, still more preferably is in the range of 120 to 300.

The heterophasic polypropylene composition (HECO) according to this invention is preferably produced in the presence of
(a) a Ziegler-Natta catalyst (ZN-C) comprising an internal donor (ID),
(b) optionally a co-catalyst (Co), and
(c) optionally an external donor (ED).

As mentioned above the Ziegler-Natta catalyst (ZN-C) is optionally modified by the so called BNT-technology during the above described pre-polymerization step in order to introduce the polymeric nucleating agent.

Such a polymeric nucleating agent is as described above a vinyl polymer, such as a vinyl polymer derived from monomers of the formula

as described above.

The weight ratio of vinyl compound to polymerization catalyst in the modification step of the polymerization catalyst preferably is 0.3 or more up to 40, such as 0.4 to 20 or more preferably 0.5 to 15, like 0.5 to 2.0.

The polymerization of the vinyl compound, e. g. VCH, can be done in any inert fluid that does not dissolve the polymer formed (e. g. polyVCH). It is important to make sure that the viscosity of the final catalyst/polymerized vinyl compound/inert fluid mixture is sufficiently high to prevent the catalyst particles from settling during storage and transport.

The adjustment of the viscosity of the mixture can be done either before or after the polymerization of the vinyl compound. It is, e. g., possible to carry out the polymerization in a low viscosity oil and after the polymerization of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerized vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10, preferably less than 3, more preferably about 0.1 to 2.0, and in particular about 0.1 to 1.5. It should be noted that no benefits are achieved by using vinyl compounds in excess.

Further, the reaction time of the catalyst modification by polymerization of a vinyl compound should be sufficient to allow for complete reaction of the vinyl monomer, i.e. the polymerization is continued until the amount of unreacted vinyl compounds in the reaction mixture (including the polymerization medium and the reactants) is less than 0.5 wt %, in particular less than 2000 ppm by weight (shown by analysis). Thus, when the pre-polymerized catalyst contains a maximum of about 0.1 wt % vinyl compound, the final vinyl compound content in the polypropylene will be below the limit of determination using the GC-MS method (<0.01 ppm by weight). Generally, when operating on an industrial scale, a polymerization time of at least 30 minutes is required, preferably the polymerization time is at least 1 hour and in particular at least 5 hours. Polymerization times even in the range of 6 to 50 hours can be used. The modification can be done at temperatures of 10 to 60° C., preferably 15 to 55° C.

General conditions for the modification of the catalyst are also disclosed in WO 00/6831, incorporated herein by reference with respect to the modification of the polymerization catalyst.

The preferred embodiments as described previously in the present application with respect to the vinyl compound also apply with respect to the polymerization catalyst of the present invention and the preferred polypropylene composition in accordance with the present invention.

Suitable media for the modification step include, in addition to oils, also aliphatic inert organic solvents with low viscosity, such as pentane and heptane. Furthermore, small amounts of hydrogen can be used during the modification.

Therefore a process for the production of a heterophasic propylene copolymer (HECO) of the present invention is also an object of the present invention. Such a process comprises polymerizing propylene in at least 2 subsequent polymerization steps in the presence of
a) a Ziegler-Natta catalyst comprising compounds (TC) of a transition metal of Group 4 to 6 of IUPAC, a Group 2 metal compound and an internal donor,
b) a co-catalyst (Co), and
c) optionally an external donor (ED)
and optionally subsequent visbreaking.

Use of Heterophasic Propylene Copolymer (HECO)

The present invention is not only directed to the instant heterophasic propylene copolymer (HECO) but also to unoriented films made therefrom. Accordingly, in a further embodiment the present invention is directed to unoriented films, like cast films or blown films, e.g. air cooled blown films, comprising at least 70.0 wt %, preferably comprising at least 80.0 wt %, more preferably comprising at least 90.0 wt %, still more preferably comprising at least 95.0 wt %, yet more preferably comprising at least 99.0 wt %, of the instant heterophasic propylene copolymer (HECO).

One distinguishes between unoriented and oriented films (see for instance polypropylene handbook, Nello Pasquini, $2^{nd}$ edition, Hanser). Oriented films are typically monoaxially or biaxially oriented films, whereas unoriented films are cast or blown films. Accordingly, an unoriented film is not drawn intensively in machine and/or transverse direction as done by oriented films. Thus the unoriented film according to this invention is not a monoaxially or biaxially oriented film. Preferably the unoriented film according to the instant invention is a blown film or cast film.

In one specific embodiment the unoriented film is a cast film or an air-cooled blown film, most preferred the unoriented film is a cast film.

Preferably the unoriented film has a thickness of 10 to 1000 μm, more preferably of 20 to 700 μm, like of 40 to 500 μm.

The present invention is also directed to the use of the heterophasic propylene copolymer (HECO) in the manufacture of unoriented films, like cast films or blown films, e.g. air cooled blown films.

EXPERIMENTAL PART

A. Measuring Methods

The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the isotacticity and regioregularity of the propylene homopolymers.

Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}C\{^{1}H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio-defects:

$P_{total}=P_{12}+P_{21e}$

The mole percent of 2,1 erythro regio-defects was quantified with respect to all propene:

[21e] mol %=100*($P_{21e}/P_{total}$)

Comonomer Determination by NMR Spectroscopy

Quantitative nuclear-magnetic resonance (NMR) spectroscopy was further used to quantify the comonomer content and comonomer sequence distribution of the polymers. Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}$C{$^1$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W.-J., Zhu, S., Macromolecules 33 (2000), 1157) through integration of multiple signals across the whole spectral region in the $^{13}$C{$^1$H} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$E = 0.5(S\beta\beta + S\beta\gamma + S\beta\delta + 0.5(S\alpha\beta + S\alpha\gamma))$ Through the use of this set of sites the corresponding integral equation becomes:

$E = 0.5(I_H + I_G + 0.5(I_C + I_D))$ using the same notation used in the article of Wang et. al. (Wang, W.-J., Zhu, S., Macromolecules 33 (2000), 1157). Equations used for absolute propylene content were not modified.

The mole percent comonomer incorporation was calculated from the mole fraction:

$E[\text{mol \%}] = 100 * fE$

The weight percent comonomer incorporation was calculated from the mole fraction:

$E[\text{wt \%}] = 100 * (fE * 28.06) / ((fE * 28.06) + ((1 - fE) * 42.08))$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The relative content of isolated to block ethylene incorporation of the XCS fraction was calculated from the triad sequence distribution using the following relationship (equation (I)):

$$I(E) = \frac{fPEP}{(fEEE + fPEE + fPEP)} \times 100 \qquad (I)$$

wherein
I(E) is the relative content of isolated to block ethylene sequences [in %] of the XCS fraction;
fPEP is the mol fraction of propylene/ethylene/propylene sequences (PEP) of the XCS fraction;
fPEE is the mol fraction of propylene/ethylene/ethylene sequences (PEE) and of ethylene/ethylene/propylene sequences (EEP) of the XCS fraction;
fEEE is the mol fraction of ethylene/ethylene/ethylene sequences (EEE) of the XCS fraction.

The xylene soluble fraction at room temperature (XCS, wt %): The amount of the polymer soluble in xylene is determined at 25° C. according to ISO 16152; 5$^{th}$ edition; 2005-07-01.

Intrinsic Viscosity (IV)

The intrinsic viscosity (IV) value increases with the molecular weight of a polymer. The IV values e.g. of the XCS were measured according to ISO 1628/1 in decalin at 135° C.

DSC analysis, melting temperature ($T_m$), melting enthalpy ($H_m$), crystallization temperature ($T_c$) and crystallization enthalpy ($H_c$): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and crystallization enthalpy ($H_c$) are determined from the cooling step, while melting temperature ($T_m$) and melting enthalpy ($H_m$) are determined from the second heating step respectively from the first heating step in case of the webs.

The glass transition temperature Tg is determined by dynamic mechanical thermal analysis according to ISO 6721-7. The measurements are done in torsion mode on compression moulded samples (40×10×1 mm$_3$) between −100° C. and +150° C. with a heating rate of 2° C./min and a frequency of 1 Hz.

MFR$_2$ (230° C.) is measured according to ISO 1133 (230° C., 2.16 kg load)

The melt flow rate is measured as the MFR$_2$ in accordance with ISO 1133 15 (230° C., 2.16 kg load) for polypropylene and in accordance with ISO 1133 (190° C., 2.16 kg load) for polyethylene and is indicated in g/10 min. The MFR is an indication of the flowability, and hence the processability, of the polymer. The higher the melt flow rate, the lower the viscosity of the polymer.

The $MFR_2$ of a fraction (B) produced in the presence of a fraction (A) is calculated using the measured values of $MFR_2$ of fraction (A) and the mixture received after producing fraction (B) ("final"):

$$Log(MFR_{final}) = \text{weight fraction}(A) * Log(MFR_A) + \text{weight fraction}(B) * Log(MFR_B)$$

Melting Temperature

Melting temperature (Tm) was measured with a Mettler TA820 differential scanning calorimetry (DSC) apparatus on 5 to 10 mg samples. DSC was performed according to ISO 3146 (part 3, method C2) in a heat/cool/heat 15 cycle with a scan rate of 10° C./min in the temperature range of +23 to +210° C. Melting temperature was determined from the second heating step.

Haze was determined according to ASTM D1003-00 on cast films of 50 μm thickness produced on a monolayer cast film line with a melt temperature of 220° C. and a chill roll temperature of 20° C.

B. Examples

The catalyst used in the polymerization process for the heterophasic propylene copolymer (HECO) of the inventive examples (IE1 to 4) and of CE1 was the commercial ZN180M of LyondellBasell with triethyl-aluminium (TEA) as co-catalyst and dicyclopentyl dimethoxy silane (donor D) as donor. Polymerization data is shown in Table 1.

TABLE 1

Polymerization data for IE1 to E4 and CE1

|  | IE1 | IE2 | IE3 | IE4 | CE 1 |
|---|---|---|---|---|---|
| TEAL/Ti [mol/mol] | 174 | 257 | 266 | 279 | 286 |
| TEAL/Donor [mol/mol] | 8.2 | 8.3 | 8.3 | 8.3 | 8.4 |
| Prepolymerization |  |  |  |  |  |
| Temperature [° C.] | 29 | 29 | 30 | 30 | 30 |
| Residence time [h] | 0.36 | 0.36 | 0.36 | 0.36 | 0.35 |
| Loop R1 |  |  |  |  |  |
| R1 Temperature [° C.] | 80 | 80 | 80 | 80 | 80 |
| R1 pressure [bar] | 5465 | 5465 | 5465 | 5465 | 5465 |
| R1 Residence time [h] | 0.39 | 0.41 | 0.42 | 0.42 | 0.40 |
| R1 H2/C3 ratio [mol/kmol] | 0.34 | 0.34 | 0.34 | 0.36 | 0.33 |
| R1 Split [%] | 55 | 55.5 | 61 | 56 | 51 |
| R1 MFR2 [g/10 min] | 1.1 | 1.2 | 1.2 | 1.2 | 1.2 |
| R1 XCS [wt %] | 2.5 | 2.5 | 2.5 | 2.5 | 2.5 |
| GPR1 R2 |  |  |  |  |  |
| R2 Temperature [° C.] | 80 | 80 | 80 | 80 | 80 |
| R2 pressure [bar] | 2600 | 2600 | 2600 | 2600 | 2600 |
| R2 Residence time [h] | 2.6 | 2.6 | 2.4 | 2.5 | 2.6 |
| R2 H2/C3 ratio [mol/kmol] | 2.2 | 2.2 | 2.2 | 2.5 | 2.2 |
| R2 split [%] | 36.5 | 35.5 | 27 | 35 | 36.5 |
| R2 MFR2 [g/10 min] Matrix ($MFR_M$) | 1.2 | 1.2 | 1.2 | 1.4 | 1.4 |
| R2 XCS [wt %] | 2.0 | 2.1 | 2.1 | 2.1 | 2.1 |
| GPR R3 |  |  |  |  |  |
| R3 Temperature [° C.] | 70 | 70 | 70 | 70 | 70 |
| R3 pressure [bar] | 2500 | 2500 | 2500 | 2500 | 2500 |
| R3 Residence time [h] | 1.4 | 1.5 | 1.1 | 0.8 | 1.0 |
| R3 C2/C3 ratio [mol/kmol] | 243 | 465 | 450 | 457 | 802 |
| R3 H2/C2 ratio [mol/kmol] | 134 | 57 | 305 | 500 | 136 |
| R3 split [%] | 8.5 | 9 | 12 | 9 | 12.5 |
| R3 MFR2 [g/10 min] total ($MFR_T$) | 1.7 | 1.4 | 1.9 | 2.2 | 1.9 |

TABLE 1-continued

Polymerization data for IE1 to E4 and CE1

|  | IE1 | IE2 | IE3 | IE4 | CE 1 |
|---|---|---|---|---|---|
| R3 XCS [wt %] | 11.2 | 12.4 | 15.3 | 11.8 | 17.2 |
| R3 C2 content [wt %] | 3.8 | 6.8 | 7.7 | 5.3 | 13.7 |

The properties of the products obtained from the individual reactors naturally are not measured on homogenized material but on reactor samples (spot samples). The properties of the final resin are measured on homogenized material.

CE 2 is the commercial product BA110CF, a heterophasic propylene copolymer available from Borealis AG, Austria.

TABLE 2 properties of the polymers of IE1 to IE4 and CE1 and CE2

| Final product | IE1 | IE2 | IE3 | IE4 | CE 1 | CE2 |
|---|---|---|---|---|---|---|
| $MFR_2$ [g/10 min] total | 1.8 | 1.5 | 2.0 | 2.4 | 2.0 | 0.85 |
| C2 content [wt %] total | 3.8 | 5.9 | 7.7 | 5.2 | 13.3 | 8.7 |
| XCS [wt %] | 11.2 | 12.4 | 15.3 | 11.8 | 17.2 | 16.7 |
| C2 of XCS [wt %] | 29.2 | 38.0 | 39.7 | 38.2 | 51.6 | 38.7 |
| Intrinsic viscosity of XCS [dl/g] | 1.97 | 2.68 | 1.70 | 1.34 | 2.35 | 2.50 |
| C2 of XCI [wt %] | 1.5 | 2.9 | 3.0 | 2.5 | 6.7 | 3.8 |
| $T_{m, PP}$ (DSC) [° C.] | 165 | 165 | 165 | 164 | 164 | 165 |
| $T_{m, PE}$ (DSC) [° C.] | —* | —* | —* | —* | 120 | 118 |
| $H_{m, PP}$ (DSC) [° C.] | 94 | 96 | 91 | 96 | 84.2 | 92 |
| $H_{m, PE}$ (DSC) [° C.] | 0 | 0 | 0 | 0 | 0.4 | 1.1 |
| $T_c$ (DSC) [° C.] | 119 | 121 | 120 | 120 | 119 | 114 |
| $T_{g, PP}$ (DMA) [° C.] | 1.2 | 2.2 | 1.6 | 1.9 | 2.5 | 2.3 |
| $T_{g, EPR}$ (DMA) [° C.] | -42 | -56 | -55 | -55 | -57 | -55 |

* no component c) present

The inventive (IE2 and IE3) and comparative (CE1) heterophasic propylene copolymers (HECOs) have been visbroken by using a co-rotating twin-screw extruder at 200-230° C. and using an appropriate amount of (tert.-butylperoxy)-2,5-dimethylhexane (Trigonox 101, distributed by Akzo Nobel, Netherlands) to achieve the target $MFR_2$ as mentioned in table 2. Visbroken HECOs are named IE2b, IE3b, and CE1b.

CE2b is the visbroken commercial grade BD212CF available from Borealis AG, Austria.

All products (IE1, IE2+IE2b, IE3+IE3b, IE4, CE1+CE1b) were stabilized with 0.2 wt % of Irganox B225 (1:1-blend of Irganox 1010 (Pentaerythrityl-tetrakis(3-(3',5'-di-tert.butyl-4-hydroxytoluyl)-propionate and tris (2,4-di-t-butylphenyl) phosphate) phosphite) of BASF AG, Germany) and 0.1 wt % calcium stearate.

TABLE 3

Properties of polymers of IE2b, IE3b and CE1b and CE2b after visbreaking

|  |  | IE2b | IE3b | CE1b | CE2b |
|---|---|---|---|---|---|
| MFR$_2$ | [g/10 min] | 5.7 | 5.4 | 5.0 | 5.0 |
| VR | [—] | 3.8 | 2.7 | 2.6 | 5.9 |
| C2 (total) | [wt %] | 6.8 | 7.7 | 13.7 | 8.5 |
| XCS | [wt %] | 15.5 | 12.1 | 17.3 | 16.9 |
| C2 (XCS) | [wt %] | 38.1 | 39.9 | 51.2 | 38.8 |
| C2 (XCI) | [wt %] | 3.0 | 2.8 | 6.8 | 4.0 |
| IV (XCS) | [dl/g] | 1.95 | 1.40 | 1.94 | 1.70 |
| T$_{m, PP}$ (DSC) | [° C.] | 164 | 165 | 164 | 164 |
| T$_{m, PE}$ (DSC) | [° C.] | —* | —* | 103 | 97 |
| H$_{m, PP}$ (DSC) | [J/g] | 95 | 93 | 87 | 91 |
| H$_{m, PE}$ (DSC) | [J/g] | 0 | 0 | 1.2 | 1.1 |
| T$_c$ (DSC) | [° C.] | 119 | 121 | 119 | 113 |
| T$_{g, PP}$ (DMA) | [° C.] | 2.5 | 1.4 | 2.5 | 2.1 |
| T$_{g, EPR}$ (DMA) | [° C.] | −56 | −55 | −58 | −55 |

VR visbreaking ratio
* no component c) present

Table 4 shows the relative content of isolated to block ethylene incorporation of the XCS fractions and the haze of IE1, IE2+IE2b, IE3+IE3b, IE4, CE1+CE1b, CE2+CE2b

TABLE 4

|  |  | IE1 | IE2 | IE2b | IE3 | IE3b | IE4 | CE1 | CE1b | CE2 | CE2b |
|---|---|---|---|---|---|---|---|---|---|---|---|
| I(E)[1] XCS | [%] | 27.53 | 18.77 | 18.73 | 19.85 | 19.91 | 19.90 | 12.28 | 12.25 | 22.80 | 22.81 |
| fEEE XCS | [mol-%] | 12.11 | 18.28 | 18.55 | 19.11 | 19.02 | 18.43 | 29.09 | 29.25 | 16.76 | 16.55 |
| fEEP XCS | [mol-%] | 15.55 | 20.11 | 20.32 | 20.75 | 20.23 | 19.82 | 24.12 | 24.32 | 21.43 | 21.32 |
| fPEP XCS | [mol-%] | 10.51 | 8.87 | 9.76 | 9.87 | 9.76 | 9.5 | 7.45 | 7.48 | 11.28 | 11.19 |
| Inequation (I) fulfilled |  | yes | yes | yes | yes | yes | yes | no | no | no | no |
| haze | % | 13 | 28 | 24 | 14 | 7 | 11 | 42 | 49 | 30 | 22 |

$$^{1)}I(E) = \frac{fPEP}{(fEEE + fPEE + fPEP)} \times 100$$

FIG. 1 shows that the requirement of the relation between I(E) of XCS and C2 of XCS is only met for the Inventive Examples (the dashed line indicates the limit of equation (I))

The invention claimed is:

1. A heterophasic propylene copolymer (HECO), said heterophasic propylene copolymer (HECO) comprises a matrix (M) being a propylene homopolymer (H-PP) and an elastomeric propylene copolymer (EPC) dispersed in said matrix (M),
wherein the heterophasic propylene copolymer (HECO) has
(a) a melt flow rate MFR$_2$ (2.16 kg, 230° C.) measured according to ISO 1133 in the range of 0.2 to 8.0 g/10 min,
(b) a xylene cold soluble content (XCS) determined according ISO 16152 (25° C.) in the range of 10.0 to 20.0 wt %, and
(c) a total ethylene comonomer content in the range of more than 2.5 to 8.0 wt %,
wherein further;
(d) the melt flow rate MFR$_2$ (2.16 kg, 230° C.) measured according to ISO 1133 of the matrix (M) is in the range of 0.2 to 4.0 g/10 min
(e) the ethylene comonomer content of xylene cold soluble (XCS) fraction of the heterophasic propylene copolymer is in the range of 25.0 to 40.0 wt %,
(f) the intrinsic viscosity (IV) determined according to DIN ISO 1628/1 (in decalin at 135° C.) of the xylene cold soluble (XCS) fraction of the heterophasic propylene copolymer is in the range of more than 1.0 to below 2.9 dl/g, and
(g) the relative content of isolated to block ethylene sequences (I(E)) of the XCS fraction fulfilling the in equation (I):

$$I(E)(XCS) < 54 - 0.81 \times C2(XCS) \quad (I)$$

wherein C2 is the comonomer content of the XCS fraction, XCS is the amount of xylene cold soluble fraction in, and
wherein the I(E) content is defined by equation (II):

$$I(E) = fPEP/((fEEE + fPEE + fPEP)) \times 100 \quad (II)$$

wherein
I(E) is the relative content of isolated to block ethylene sequences of the XCS fraction;
fPEP is the mol fraction of propylene/ethylene/propylene sequences (PEP) of the XCS fraction;
fPEE is the mol fraction of propylene/ethylene/ethylene sequences (PEE) and of ethylene/ethylene/propylene sequences (EEP) of the XCS fraction;
fEEE is the mol fraction of ethylene/ethylene/ethylene sequences (EEE) of the XCS fraction,
wherein all sequence concentrations are based on a statistical triad analysis of 13C-NMR data from the XCS fraction of the heterophasic copolymer.

2. The heterophasic propylene copolymer (HECO) according to claim 1, which further comprises component (c) being a crystalline ethylene copolymer (CEC), and/or
(d) a nucleating agent.

3. The heterophasic propylene copolymer (HECO) according to claim 1, wherein the heterophasic propylene copolymer (HECO) comprises 82.0 to 93.0 wt %, based on the total weight of the heterophasic propylene copolymer HECO, of the propylene homopolymer (H-PP), 7.0 to 18.0 wt %, based on the total weight of the heterophasic propylene copolymer (HECO), of the elastomeric propylene copolymer (EPC), 0.0 to 5.0 wt %, based on the total weight of the heterophasic propylene copolymer (HECO), of a crystalline ethylene copolymer (CEC) and from 0.0 to 0.1 wt %, based on the total weight of the heterophasic propylene copolymer (HECO), of a nucleating agent.

4. The heterophasic propylene copolymer (HECO) according to claim 1, wherein xylene solubles fraction of the propylene homopolymer matrix is in the range of 0.5 wt % to 3.0 wt %.

5. The heterophasic propylene copolymer (HECO) according to claim 1, wherein the ethylene content of the cold insoluble fraction (XCI) of the heterophasic propylene copolymer (HECO) is in the range of 1.0 to 3.5 wt %.

6. The heterophasic propylene copolymer (HECO) according to claim 1, wherein the matrix (M) is unimodal or bimodal.

7. The heterophasic propylene copolymer (HECO) according to claim 6, wherein the matrix is bimodal and consists of two propylene homopolymer fractions (H-PP-1) and (H-PP-2).

8. The heterophasic propylene copolymer (HECO) according to claim 1, wherein the heterophasic propylene copolymer (HECO) is a non-visbroken heterophasic propylene copolymer (HECO).

9. The heterophasic propylene copolymer (HECO) according to claim 1, wherein the heterophasic propylene copolymer (HECO) has been visbroken with a visbreaking ratio (VR) as defined by the inequality VR>1.0,
wherein VR=$MFR_{final}$/$MFR_{start}$,
wherein $MFR_{final}$ is the $MFR_2$ (230° C./2.16 kg) of the heterophasic propylene copolymer (HECO) after visbreaking, and
wherein $MFR_{start}$ is the $MFR_2$ (230° C./2.16 kg) of the heterophasic propylene copolymer (HECO) before visbreaking.

10. The heterophasic propylene copolymer (HECO) according to claim 1, wherein the heterophasic propylene copolymer (HECO) has a haze determined according to ASTM D 1003-00 measured on a 50 μm cast film of below 30%.

11. The heterophasic propylene copolymer (HECO) according to claim 1, wherein the heterophasic propylene copolymer (HECO) has a haze determined according to ASTM D 1003-00 measured on a 50 μm cast film of below 20%.

12. A polymerization process for producing the heterophasic propylene copolymer (HECO) according to claim 1 comprising polymerizing propylene in at least two subsequent polymerization steps in the presence of a Ziegler-Natta catalyst (ZN-C), whereby:
   a) in the first polymerization reactor (R1) propylene is polymerized obtaining either a first propylene homopolymer fraction (H-PP-1) or the propylene homopolymer matrix (M), transferring said first propylene homopolymer fraction (H-PP-1) or propylene homopolymer matrix (M) to a second polymerization reactor (R2),
   b) in the second polymerization reactor (R2) either a second propylene homopolymer fraction (H-PP-2), forming together with the first propylene homopolymer fraction (H-PP-1) the propylene homopolymer matrix (M) or,
   the propylene copolymer fraction (EPC) in the presence of the propylene homopolymer matrix (M) produced in earlier steps is produced, whereupon
   c) if in the first and the second polymerization reactor the propylene homopolymer matrix (M) is produced, in an optional third polymerization reactor the propylene copolymer fraction (EPC) in the presence of the propylene homopolymer matrix (M) produced in earlier steps is produced and
   d) optionally subsequent visbreaking of the heterophasic propylene copolymer (HECO) obtained after step b) respectively c).

13. The process according to claim 12, wherein the process further comprises a prepolymerization step prior to step a), whereby propylene is polymerized in a pre-polymerization reactor (PR) in the presence of a Ziegler-Natta catalyst (ZN-C) to obtain a mixture (MI) of the Ziegler-Natta catalyst and a polypropylene (Pre-PP), and subsequently the mixture (MI) of the Ziegler-Natta catalyst and the polypropylene (Pre-PP) is transferred to the first polymerization reactor (R1).

* * * * *